United States Patent [19]

King et al.

[11] 3,984,604

[45] Oct. 5, 1976

[54] AROMATIC POLYSULPHONE COATED ARTICLE AND BONDED STRUCTURE

[75] Inventors: Terence King, New Barnet; John Brewster Rose, Letchworth, both of England

[73] Assignee: Imperial Chemical Industries Limited, London, England

[22] Filed: Apr. 16, 1974

[21] Appl. No.: 461,405

Related U.S. Application Data

[63] Continuation-in-part of Ser. No. 381,380, July 27, 1973, abandoned, which is a continuation-in-part of Ser. No. 150,905, June 8, 1971, Pat. No. 3,769,150.

[30] Foreign Application Priority Data

| June 19, 1970 | United Kingdom | 29907/70 |
| July 15, 1970 | United Kingdom | 34317/70 |
| Feb. 5, 1971 | United Kingdom | 4033/71 |
| Nov. 19, 1973 | United Kingdom | 53582/73 |
| Apr. 16, 1973 | United Kingdom | 18183/73 |
| Apr. 16, 1973 | United Kingdom | 18184/73 |
| Apr. 16, 1973 | United Kingdom | 18185/73 |

[52] U.S. Cl. ................................ 428/411; 428/457
[51] Int. Cl.$^2$ ........................................ C09J 7/02
[58] Field of Search ....... 117/122 P, 122 H, 133 PF, 117/135.1; 161/167, 182; 156/327; 260/47 R, 79.3 R; 427/382, 379; 428/207, 457, 411

[56] References Cited

UNITED STATES PATENTS

| 3,471,587 | 10/1969 | Whittemore et al. | 117/132 X |
| 3,499,780 | 3/1970 | Etherington et al. | 117/135.1 X |
| 3,542,574 | 11/1970 | Payne | 117/135.1 X |
| 3,674,738 | 7/1972 | Nitzsche et al. | 117/135.1 X |
| 3,769,150 | 10/1973 | King et al. | 117/122 X |

FOREIGN PATENTS OR APPLICATIONS

| 1,060,546 | 4/1964 | United Kingdom |
| 1,153,035 | 9/1966 | United Kingdom |

*Primary Examiner*—Bernard D. Pianalto
*Attorney, Agent, or Firm*—Cushman, Darby & Cushman

[57] ABSTRACT

A solid surface is coated with an adhesive composition comprising an aromatic polysulphone which has a reduced viscosity of at least 0.3 and which contains at least 0.2 (desirably 0.5 to 3.5) hydroxyl groups per 100 polymer repeat units and has been heated at 330° to 450°C in the presence of oxygen.

10 Claims, No Drawings

AROMATIC POLYSULPHONE COATED ARTICLE AND BONDED STRUCTURE

This application is a continuation-in-part application of U.S. Pat. application Ser. No. 381,380 filed 27 July 1973, now abandoned, said Ser. No. 381,380 being a continuation-in-part of Ser. No. 150,905, filed June 8, 1971, now U.S. Pat. No. 3,769,150.

This invention relates to aromatic polysulphone adhesive compositions.

It is stated in British Specification No. 1,016,245 that polymeric materials comprising repeating units having the structure —Ar—SO$_2$— show good adhesion to surfaces of glass and metals and may be used as high-temperature thermoplastic adhesives. In this structural formula Ar is a divalent aromatic residue which may vary from unit to unit in the polymer chain and in at least some of the units Ar has the structure I

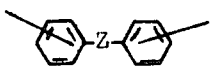

(I)

(where Z is an oxygen or sulphur atom or the residue of a 4,4'-bisphenol, i.e. the divalent structure obtained by removing the two hydroxyl hydrogen atoms) and in any other units Ar is a residue of benzene, diphenyl, or a polynuclear aromatic hydrocarbon containing not more than two aromatic nuclei, so that in the divalent aromatic residues containing two benzene rings each benzene ring bears one of the valencies, and one or more of the aromatically bound hydrogen atoms in any of the divalent aromatic residues may be replaced by halogen atoms or alkyl or alkoxy groups containing from 1 to 4 carbon atoms. It is said that the polymers may be blended with other polymeric materials and may contain any other suitable ingredients such as fillers. One of the polymers particularly described in British Specification No. 1,016,245 contains units having the structure

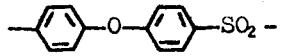

It is stated also in British Specification No. 1,060,546 that thermoplastic polymers consisting essentially of repeating units of the formula —L—A— can be used as adhesives or coatings. In this structural formula A represents an aromatic group, and in from 10 to 50% of the units L represents the linkage —O— and in the other units L represents the —SO$_2$—, each aromatic group A being connected to no more than one linkage L represented by the linkage —O—. One of the polymers particularly described in British Specification No. 1,060,546 is said to contain repeating units of the formula

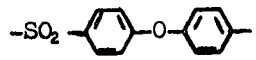

It is stated also in British Specification No. 1,136,766 that thermoplastic polyarylene polyethers composed of recurring units having the formula ─O─E─O─E'─ are virtually universally adherent and that structural elements may utilise such polymers in structural and/or bonding capacities. In this structural formula E is the residuum of a dihydric phenol and E' is the residuum of a benzenoid compound having an inert electron-withdrawing group in at least one of the positions *ortho* and *para* to the valance bonds, and both of said residua are valently bonded to the ether oxygens through aromatic carbon atoms. The polymer is said to be conveniently made by the reaction of an alkali metal double salt of dihydric phenol and a dihalobenzenoid compound having the electron-withdrawing group. Of the polymer speifically described as bonding agents in British Specification No. 1,136,766 one is said to be composed of recurring units having the formula

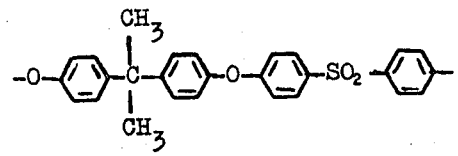

and another to have units of the formula

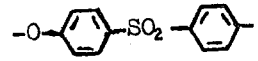

It is said that the polymers are of high molecular weight indicated by a reduced viscosity which is preferably above about 0.4.

Thermoplastic polymers of this type may also be made by the processes described in British Specifications Nos. 1,153,035 and 1,177,183. The disclosure of all the aforesaid five specifications is incorporated herein by reference.

Blends of such thermoplastic polysulphones with various other polymeric materials are said to be useful as adhesives in the following patent specifications:

| Other polymeric material | Patent Specification |
| --- | --- |
| aromatic polycarbonate | British 1 140 961 |
| organopolysiloxane | " |
| polyacrylate | " |
| CH$_2$CF$_2$/C$_3$F$_6$ copolymer | " |
| aromatic polyhydroxyethers | British 1 141 030 |
| fluoroaliphatic-substituted polyphenylene oxides | U.S. 3 471 587 |
| α-olefin/acrylonitrile copolymers | British 1 221 083 |
| nitrile rubbers | Dutch 68 08868 |
| siloxane/polysulphone block copolymers | Dutch 69 04310 |
| | German 1 927 787 |

The "aromatic polyhydroxyethers" are thermoplastic condensation products of dihydric phenols and bifunctional epoxides, e.g. an epihalohydrin or a diepoxide.

According to British Specification No. 1,169,613 various sulphone resins, including polyhydroxy polyether polysulphones (obtained from a dihydric phenol and a diglycidyl ether of a dihydric phenol, one or both phenols having two aryl groups linked by a sulphone group) as well as the thermoplastic polysulphones described above, can be incorporated into hardenable epoxide resins (i.e. epoxide resins containing a hardening agent) to be used as adhesives. The compositions may contain fillers such as asbestos, glass, boron or carbon fibers or powdered metals, especially aluminum. The thermoplastic polysulphone in these compositions is said to act as a thickening agent, reducing the amount of epoxide resin that escapes from the area to be bonded when pressure is applied. Preferred polysulphones for use in the compositions are said to be those wherein the repeating unit contains ether groups but is free from pendent hydroxyl groups. Similar compositions containing in addition a copolymer of ethylene and α-olefinic ester (e.g. alkyl acrylate or methacrylate, vinylacetate) are described in German Specification No. 1,935,115.

Blends of certain aromatic polysulphones with other polymers are also described in the following patent specifications:

| Other polymeric material | Patent Specification |
|---|---|
| polyolefin | U.S. 3 472 810 |
| polyphenylene oxide | British 1 180 847 |
| thermosetting resins | French 1 579 310 |
| ABS | British 1 196 066 |
| polyvinyl chloride | British 1 209 718 |
| polymethylmethacrylate | German 1 944 044 |

It has now been found that the adherence of a thermoplastic polymer of the above-described type is not only dependent on its molecular weight but also is affected strongly by the nature of the predominant end-groups of the polymer chain. Polysulphones having predominantly phenolic (—OH) end-groups have greatly enhanced adhesive properties.

According to the present invention, a solid surface is coated with, or bonded to another surface by means of, an adhesive composition comprising an aromatic polysulphone whose number-average molecular weight is sufficiently high to give a reduced viscosity of at least 0.3 (measured at 25°C on a solution in dimethyl formamide containing 1 g of the polysulphone in 100 cm³ of solution) and which contains at least 0.2 aromatically bound hydroxyl groups per 100 polymer repeat units. The number of aromatically bound hydroxyl groups per 100 polymer repeat units contained by the aromatic polysulphone is preferably more than 0.5 (desirably more than 1.0) and desirably not more than 3.5 (preferably not more than 3.0).

Aromatic polysulphones having hydroxyl end-groups may be prepared from the products described in British Specifications Nos. 1,153,035 and 1,177,183 by acidification of the anionic oxygen end-groups. Alternatively, an aromatic polysulphone with a preponderance of hydroxyl end-groups may be obtained by the reaction of a dihydric phenol (or its alkali metal double salt) with a dihalobenzenoid compound as described and claimed in British Specification No. 1,136,766 (or more fully in British Specifications Nos. 1,078,234 and 1,133,561) provided that the alkali metal double salt of the dihydric phenol is present in excess and the polymerisation reaction is followed by acidification. The desired polysulphone may also be obtained from the self-condensation of an alkali metal salt of a halogenophenylsulphonyl phenol as described and claimed in British Specification Nos. 1,153,035 and 1,177,183 in the presence of a minor amount of an alkali metal double salt of a dihydric phenol, followed by acidification. Preferred are those polymers having predominantly hydroxyl end-groups and based on the repeat unit having the formula I or II either alone or in combination with each other and/or with up to 80% of units having the formula III,

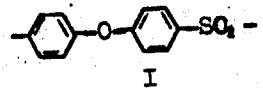
I

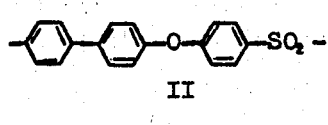
II

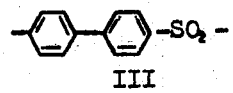
III or based on the repeat unit having the formula IV

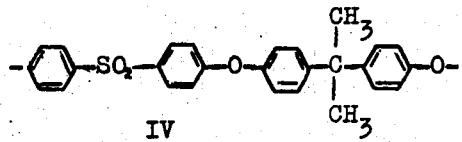
IV in which formulae the hydrogen atoms of the aromatic rings may optionally be substituted by inert atoms or groups.

The hydroxyl-containing aromatic polysulphone may be applied to the solid surface in any of the customary ways for applying adhesives. For example it may be applied as a paste, solution or suspension, by brushing, impregnating, dipping or spraying; by laminating a film of the polymer to the surface; or by any other suitable technique, such as for example (i) coating by melt extrusion of the polymer, (ii) powder coating, or (iii) fluidized bed coating of a preheated solid surface. By the variety of coating techniques that may be used it is evident that surfaces of almost any shape and size can be coated. When the polymer is applied as a solution in a solvent, it is preferable that the solvent is one giving a polymer solution having a long pot-life: for example mixtures of cyclohexanone (15–20 parts by volume), methyl ethyl ketone (4–7 parts) and dimethyl sulphoxide (1–3 parts) containing 5 to 25 g of polymer in 100 cm³ of solution; the coated article is then dried, conveniently in an air oven at temperatures up to 150°C.

The process of bonding surfaces together should be carried out at a temperature sufficiently high and with sufficient pressure between the surfaces to allow the aromatic polysulphone to flow. Butt of lap joints may be prepared, for example, by heating the surfaces above the softening point of the polymer, inserting a film of the aromatic polysulphone between the surfaces and pressing the two interleaved surfaces together and allowing the bond to cool after optional further heating. Alternatively, the surfaces may be interleaved with polysulphone film whilst at ambient temperatures followed by pressing and heating. A similar process of pressing and heating may be used where the surfaces have been coated with polysulphone as hereinbefore described.

Solid surfaces according to the invention may be bonded together to form a two-ply laminate and any required number of such laminates may be similarly bonded together to form a multi-layer laminate having similar or dissimilar layers. The solid surfaces which are coated with and may be bonded together by a hydroxyl-containing aromatic polysulphone are preferably those which are "wetted" by the aromatic polysulphone. Such surfaces include metals, vitreous surfaces and naturally occurring and synthetic resins; and the surfaces may be in the form of sheet, film, mouldings, powder, extrudate, and fibre. Metals that may be bonded include particularly steel, stainless steel, titanium steel, titanium and aluminium; vitreous surfaces include in particular glass, ceramic and enamelled materials; resins include in particular, polyesters, polyolefines, polysulphones, polyimides and polyamides as well as carbon fibres and cellulosic materials such as wood and wood products. A comprehensive list of adherents for polysulphone adhesives is given in the aforesaid British Specification No. 1,136,766. A further feature of the adhesive bonds so formed is their resistance to high temperature so that, unlike many thermoplastic adhesives, prolonged usage at high temperatures (for example, greater than 200°C) may be facilitated.

The hydroxyl-containing aromatic polysulphone may be blended with other polymeric materials, for example any of those mentioned in the above-mentioned patent specifications relating to blends of polysulphones with vatious other polymeric materials. The hydroxyl-containing aromatic polysulphone may also contain any desired fillers, for example asbestos, glass, boron or carbon fibres or powdered metals.

An important feature of the aromatic polysulphones to be used in coating of bonding solid surfaces according to the invention is that the polymers should contain at least 0.2 hydroxyl groups per 100 polymer repeat units. The number of hydroxyl groups present in the polymer may be obtained for example by chemical means or from nuclear magnetic resonance data.

It has also been found surprisingly that heating of the above aromatic polysulphone in the presence of oxygen at temperatures of 330° to 450°C, preferably 350° to 450°C, for at least 10 minutes, preferably 15 to 60 minutes leads to an increase of molecular weight. Increase in molecular weight is evidenced by increased softening point and/or decreasing solubility in inert dipolar aprotic solvents such as for example dimethyl formamide. Because increase in molecular weight is associated with the presence of oxygen, the amount of polymer in a given form showing such an increase where oxygen is in gaseous state will depend on the thickness and form and period of heating. A thin film will show more complete and homogeneous increase in molecular weight than a thicker coating after heating for identical periods and under identical conditions.

The oxygen required for increase in molecular weight can be gaseous oxygen which may be used alone or mixed with other gas for example nitrogen, argon or as air, and is conveniently used at atmospheric pressure or can be produced chemically in situ from mixtures of the polysulphone with compounds which produce oxygen at 330° to 450°C.

This unexpected finding enables the polymers to be used in applications where even better performance is required, for example resistance to environmental high temperatures e.g. 250°C, and solvents. The substrate for the coating may be a film e.g. metal film, wire or a shaped article for example made of metal e.g. electrical components, or an article to be decorated e.g. metal tubing, or made of vitreous material e.g. glass, ceramic, china or porcelain, or made of thermosetting or high temperature thermoplastic materials. Particular applications are electrical components such as for example capacitor dielectrics, coated insulators and coil formers, high temperature adhesives and wire insulation.

The solid surface of the present invention also includes coated cookware having non-cooking surface coated with aromatic polysulphone containing at least 0.2 aromatically bound hydroxyl groups, per 100 polymer repeat units and having a reduced viscosity of at least 0.3 as measured at 25°C on a solution of the polymer in dimethyl formamide containing 1 g of polymer in 100 $cm^3$ of solution. The coating on the cookware preferably comprises pigmented aromatic polysulphone.

Decorative cookware often comprises a metal dish particularly cast iron coated with an enamel. Such cookware is generally expensive and can be prone to chipping of the enamel. Other decorative cookware comprises heat resistant glass or other vitreous material which is often pigmented, but such cookware is also generally expensive. However that provided herein is decorated by a comparatively cheap, heat resistant coating.

The aromatic polysulphone should be, at least prior to coating, thermoplastic.

The pigment which is preferably present in the coated cookware of the invention is any pigment which is stable at the cooking temperature and the temperature at which the aromatic polysulphone is treated after coating, if so treated. Suitable pigments include for example titanium dioxide, carbon black, cadmium pigments.

The molecular weight of the polymer may be increased as described herein before by heating in polymer after coating in the presence of oxygen, e.g. in air, between 330° and 450°C for at least 10 minutes. Increasing of molecular weight generally leads to improved resistance to washing-up or dishwashing procedures, and prevents softening and flow of the coating if it should become overheated.

The aromatic polysulphone, if desired premixed with pigment, may be coated onto the cookware by any one of a variety of methods already described. Alternatively a paste of the polymer may be printed onto the surface or part of the surface by printing techniques such as screen printing. Also patterns can be produced by such printing techniques or by selectively etching or dissolving away selected portions of the coating. However if no pigment is present in the initial coating it is essential that pigment be added at some subsequent stage in order to obtain a pigmented patterned surface.

The cookware may be made of metal e.g. iron, aluminium, steel or of ceramic e.g. glass, pottery, porcelain. Examples of cookware are pans and dishes, pressure cookers, frying pans, baking tins, casserole dishes.

According to a further embodiment of the present invention 10 to 90% by weight of at least one thermoplastic aromatic polysulphone having a reduced viscosity of at least 0.3 (measured at 25°C on a solution in dimethyl formamide containing 1 g of polymer in 100 $cm^3$ of solution) and containing at least 0.2 aromatically bound hydroxyl groups per 100 polymer repeat units is blended with 90 to 10% by weight of at least one fluorocarbon polymer before heating in the presence of oxygen. Accordingly in this further aspect of the present invention, an article is provided coated with a composition derived by heating a mixture which comprises (a) 10 to 90% by weight of at least one thermoplastic aromatic polysulphone having reduced viscosity of at least 0.3 (measured at 25°C on a solution in dimethyl formamide containing 1 g of polymer in 100 cm$^3$ of solution) and containing at least 0.2 aromatically bound hydroxyl groups per 100 polymer repeat units and (b) 90 to 10% by weight of at least one fluorocarbon polymer at a temperature of 330° to 450°C in the presence of oxygen. The composition comprises 10 to 90% by weight of thermoplastic aromatic polysulphone, preferably more than 15% and less than 85% asnd desirably less than 60%.

By fluorocarbon polymers there are included polytetrafluoroethylene (PTFE) and copolymers of tetrafluoroethylene with up to 15% by weight of other monomers such as ethylene, vinyl chloride and hexafluoropropene. Preferred fluorocarbon polymers are polytetrafluoroethylene and copolymers of tetrafluoroethylene with up to 5%, especially 0.05 to 2%, by weight of other monomers such as ethylene, vinyl chloride and hexafluoropropene.

The coating compositions may be prepared for example by powder blending or by melting the polysulphone with fluorocarbon polymer powder or by adding fluorocarbon polymer powder to a solution of polysulphone to form a dispersion or by mixing aqueous or organic. liquid dispersions of the polysulphone and flurocarbon polymer. Most conveniently the coating composition is prepared as a dispersion. The solution of polysulphone can be formed from any convenient solvent such as for example dimethyl formamide, dialkyl or diaryl sulphones and sulphoxides including 1,1-dioxothiolan (sulpholane). An aqueous dispersion of polysulphone can be made for example by ball milling polysulphone powder or granules with water in the presence of an emulsifier, or by precipitation from solution, preferably from dilute solution. Ball milling in the presence of water is preferred because its solvent removal is necessary, and resultant particle size is smaller.

Compositions may therefore be made by use of a dispersion of the fluorocarbon polymer in water which may be made by a polymerisation process in an aqueous medium or by dispersing a suitably finely divided solid form of the polymer in an aqueous medium.

In the preparation of aqueous dispersions of PTFE made by an aqueous polymerisation process, the tetrafluoroethylene is normally polymerised in the presence of an emulsifying agent, for example by the processes described in British Patent Specifications Nos. 689,400 and 821,353. The emulsifying agent is preferably of the anionic type in the form of a fluorinated carboxylic acid compound such as ammonium perfluorooctanoate. For use in this invention, after polymerisation, the dispersion is further stabilised by means of a surfactant and, if necessary, concentrated. Suitable stabilisers are non-ionic surfactants such as polyoxyethylated octyl phenol containing 1 to 9–10 moles of ethylene oxide per mole of octyl phenol sold by Rohm and Haas Company under the trademark "Triton" X15 and X100 respectively or a surfactant sold by Rohm and Haas Company under the trademark Triton DN65 and described by the supplies as a modified ethoxylated straight chain alcohol.

Alternatively PTFE-containing aqueous compositions may be made by mixing a PTFE powder into an aqueous medium to form a dispersion which is then blended with the polysulphone or polysulphone dispersion. Alternatively they may be made by mixing the PTFE directly into an aqueous medium containing the polysulphone or into a solution containing polysulphone. A suitable comminution step may also be needed prior to or at the same time as the mixing takes place. The PTFE may be in the form of a lubricant grade powder. By the term lubricant grade PTFE powder we mean a PTFE powder of average particle size of less than 20 $\mu$m (as measured optically) that has been prepared by processes including comminution of a high molecular weight PTFE.

Examples of commercially available dry lubricant powders are 'Fluon' L169, L170 and L171 sold by Imperial Chemical Industries Limited and "Whitcon" 5 and 8 sold by the Tetraloy Division of ICI America Inc. Fluon L170 is friable PTFE powder of 4 $\mu$m median particle size which can be broken down to smaller particle size (as low as 0.1 $\mu$m) when processed in various media e.g. by a high shear mixer. Thus Fluon L170 may be added to aqueous medium and broken down by use of a high shear mixer to produce a colloidal dispersion of the polymer in the medium in which the polysulphone is already present or to which it is added subsequently.

The substrates to which the coating compositions are applied should be clean and free from grease and unless they have a fritted surface are preferably roughened, for example by abrading by grit blasting or by etching. Coatings may be applied by any of the conventional techniques, including spraying, dipping and brushing, followed if necessary by drying. The coating is then sintered preferably in the presence of oxygen at temperatures of 330° to 450°C; preferably 350° to 400°C when the fluorocarbon polymer is a PTFE lubricant powder and preferably 380° to 420°C when the fluorocarbon polymer used to prepare the compositions is in the form of a dispersion.

The compositions may be applied as coatings to a variety of substrates, including glass, e.g. for non-stick ovenware and non-stick autoclave linings; ceramics; composite surfaces such as metal; metals such as ferrous metals, for example cast iron, mild steel, stainless steel, and aluminium and its alloys; and composite surfaces such as metals having a reinforcing coating, such as a sprayed ceramic and/or metal powder coating.

The compositions are particularly suited to coating cooking utensils, for example frying pans, saucepans and bakeware or for oven linings. In making cooking utensils, a blank may be coated and then formed, or an already formed utensil may be coated.

Compositions may also be used to form adherent non-stick, low friction, coatings on many other articles including industrial processing equipment including moulds, rollers, stirrers, mixers, chutes, hoppers and heat sealing jaws, domestic articles such as iron sole plates, food mixers and ice separators and tools such as saw blades, electrical applications such as for example wire insulation.

The invention is illustrated by the following examples.

EXAMPLE 1

The potassium salt of 4-(4-fluorophenylsulphonyl)-phenol (100 g: 0.344 mole), the anhydrous dipotassium salt of bis-(4-hydroxyphenyl) sulphone (bisphenol S) (0.68 g; 0.00207 mole) and redistilled 1,1-dioxothiolan (sulpholane) (150 g) were stirred together under nitrogen to produce a polymer of the structure

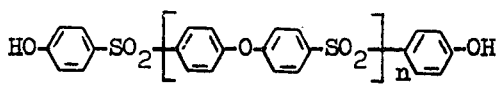

During the preparation of the polymer, portions of the reaction mixture were removed from time to time and allowed to cool to give polymers of lower and intermediate molecular weight. The residue, which had then been heated for 22 hours, was then also cooled. The soft granular solids thus obtained were macerated with water and then treated twice with boiling water containing about 1% v/v acetic acid to give the polymers with hydroxyl end-groups. Another polymerisation was carried out similarly, except that each extracted portion and the residual reaction mixture were treated at 150°C for 1 hour with methyl chloride to give, after extraction and drying, corresponding polymers with methoxyl end-groups. The hydroxyl-ended polymer of highest molecular weight was found to have a reduced viscosity of 0.50 as measured at 25°C on a solution in dimethylformamide containing 1 g of polymer in 100 cm$^3$ of solution and to contain 2.5 hydroxyl groups per 100 polymer repeat units, and the corresponding "methoxyl end-group" polymer was found to have a reduced viscosity of 0.55 and to contain 0.06 hydroxyl groups per 100 polymer repeat units.

The hydroxyl end-group and the methoxyl end-group polymers from the residual reaction mixture were compression-moulded at 300°C to produce clear tough films approximately 0.25 mm thick. The films were cut into pieces (25 × 12.5 mm) which were degreased by soaking in detergent for 18 hours, washed with distilled water and dried in vacuo at 140°C. Pieces (100 × 25 × 0.9 mm thick) of 18/8 w/w chromium/nickel stainless steel (according to British Standard 1501–821; 1958) were surface-cleaned using steel wool and an abrasive cleaner and the edges were filed down. The pieces were degreased in trichloroethylene vapour. Lap joints were prepared by sandwiching a piece of the aromatic polysulphone film between two stainless steel plates which overlapped by 12.5 mm. The assembly was held in position by a binder clip and the joint made by heating the assembly in an oven for 30 minutes at a temperature initially of 340°C, then 370°C after 15 minutes, and finally 380°C. The joint was cooled to room temperature and excess polysulphone removed.

The shear strengths of the lap joints were determined using a Davenport tensile test machine which has a shear rate of 12.5 mm/minute. Five joints fabricated from the aromatic polysulphone having 2.5 hydroxyl groups per 100 polymer repeat units were found to have tensile shear strengths of 1156; 1242; 1115; 1219; 1184 kg (average = 1184 kg). Five joints fabricated from the aromatic polysulphone having methoxyl end-groups had tensil shear strengths of 884; 559; 695; 515; 876 kg (average = 707 kg).

The shear strengths of the lap joints were examined further at higher temperatures and after ageing to show the advantage of the hydroxyl end-group aromatic polysulphone over the methoxyl end-group polymer.

|  | Hydroxyl end-group | Methoxyl end-group |
| --- | --- | --- |
| Shear strength at 150°C | 814 kg | 560 kg |
| Shear strength at 220°C | 448 kg | — |
| Shear strength at 150°C after 1000 hours at 150°C | 667 kg | 400 kg |

Similar joints were prepared in the form of a multi-layer laminate.

To determine the number of hydroxyl groups in the aromatic polysulphone, a portion of the reaction mixture was extracted and methylated and the resulting polymer worked up. The reduced viscosity of each polymer was determined and checked that it was consistent with that of the unmethylated sample. The number of methoxyl groups thus formed was then determined by nuclear magnetic resonance spectroscopy in terms of methoxyl protons to aromatic ring protons. For the polymer chain of the structure

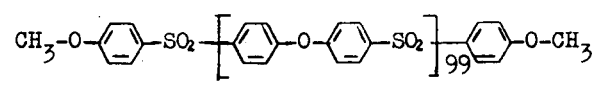

containing 100 repeat units, this ratio is 6 methoxyl protons to 800 aromatic ring protons; hence the number of methoxyl groups per 100 repeat units is given directly by the n.m.r. measurements. The number of methoxyl-groups per 100 polymer repeat units in the methylated portion is the same as the number of hydroxyl-groups per 100 polymer repeat units in the original unmethylated polymer. Such a procedure is generally satisfactory for determining the hydroxyl-group concentration of any aromatic polysulphone where the relative proportions of methoxyl protons and protons characteristic of the polymer repeat units can be obtained by n.m.r. spectroscopy.

EXAMPLE 2

Lap joints were prepared by the method of Example 1 but using stainless-steel pieces 1.6 μm thick and a polysulphone supplied by Union Carbide Corporation as "Polysulfone" P3500 said to have repeating units of the formula

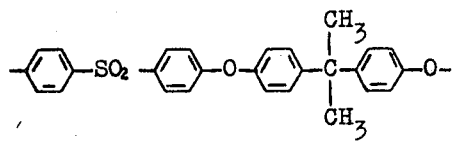

Two samples of polysulphone were obtained, both having a reduced viscosity of 0.41, but one sample contained 0.9 hydroxyl end-groups per 100 repeat units and the other sample contained 0.1 hydroxy end-groups per 100 repeat units, as determined by an n.m.r. method similar to that described in Example 1.

The shear strengths of joints fabricated from the polysulphone having 0.9 hydroxyl end-groups per 100 repeat units were 523; 626; 550; 509 kg (average =

552 kg) whilst those from the sample having 0.1 hydroxyl end-groups per 100 repeat units were 488; 302; 247; 103 kg (average = 285 kg).

Example 3

Aromatic polysulphone having 1.0 aromatically bound hydroxyl groups per 100 polymer repeat units and a reduced viscosity of 0.53 (as measured at 25°C on a solution of polymer in dimethyl formamide containing 1 g of polymer in 100 cm³ of solution) and having repeat units of the formula

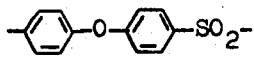

was prepared by the method of Example 1. Dry polymer was spread onto aluminium sheet to give a coating about 1 mm thick. The sheet was then heated under conditions given in the following table. After heating, the polymer film could not be stripped from the sheet; portions of the coated sheet were therefore immersed in dimethyl formamide to ascertain polymer reduced viscosity and solubility.

| Heating cycle | | | Solubility |
|---|---|---|---|
| Temperature (°C) | Time (minutes) | Atmosphere | (in dimethyl formamide) |
| 270 | 30 | air | soluble |
| 300 | 30 | air | soluble ** |
| 330 | 30 | air | soluble * |
| 350 | 30 | no air (compression moulded) | soluble ** |
| 350 | 10 | air | soluble *** |
| 350 | 15 | air | insoluble |
| 350 | 20 | air | insoluble |
| 350 | 30 | air | insoluble |

* reduced viscosity at 25°C was 0.58
** reduced viscosity at 25°C was 0.53
*** reduced viscosity at 25°C was 0.64

The results show that below 330°C, heating in air has little effect on polymer properties; that heating at 350° in the absence of air is similarly ineffective but that heating in air above 330°C initially increases molecular weight and then further heating renders the polymers insoluble in dimethyl formamide.

A similar polymer but containing 0.06 aromatically bound hydroxyl groups per 100 polymer repeat units and reduced viscosity of 0.53 showed no increase in reduced viscosity on heating in air at 350°C for 30 minutes.

EXAMPLE 4

An aromatic polysulphone having repeating units of the formula

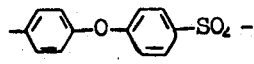

having reduced viscosity 0.52 (as measured at 25°C on a solution in dimethyl formamide containing 1 g of polymer in 100 cm³ of solution) and containing 1 hydroxyl end group per 100 polymer repeating units was made by a method similar to that described in Example 1.

A sample (100 g) of the polymer was dissolved in dimethyl formamide (300 cm³). The exterior non-cooking surface of an aluminium pan, depth 10 cm and diameter 20 cm was coated by dipping the pan into the polymer solution. The resultant coating was dried by heating in an air-circulating oven at 150°C for 1 hour and in an oven under reduced pressure (about 10 torr) at 150°C for 30 minutes. The coating was finally stoved in an oven at 350°C for 30 minutes. The coating had a thickness of about 150 μm.

The pan received normal hom kitchen use for 2 months including heating without contents on a medium natural gas flame for 6 minutes. The coating thereafter was still in good condition.

EXAMPLE 5

A sample (100 g) of polymer described in Example 4 was dissolved in a solvent mxiture comprising cyclohexanone (18 parts by volume), methyl ethyl ketone (5 parts by volume) and dimethyl sulphoxide (2 parts by volume to give a solution containing 25 g of polymer in 100 cm³ of solution. Cadmium red (2 g; light red P684 Blythe Colours Ltd., Cresswell, Stoke-on-Trent, Staffordshire) was thoroughly stirred into the solution. An aluminium pan was coated and the coating dried by the method described in Example 4. Before stoving the coating was screen printed using a paste comprising a sample of the same polymer (25 g), titanium dioxide (25 g) and dimethyl formamide (50 g). The printed layer was dried by heating in an air-circulating oven at 150°C for 1 hour. The coated and printed pan was then stoved at 350°C for 30 minutes.

The performance of the pan was similar to that of the pan described in Example 4.

EXAMPLE 6

A sample (24 g) of thermoplastic aromatic polysulphone having repeat units of the formula

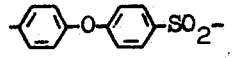

and a reduced viscosity of 0.49 (at 25°C on a solution of polymer in dimethyl formamide containing 1 g of polymer in 100 cm³ of solution) and 1.02 aromatically bound hydroxyl groups per 100 polymer repeat units was dissolved in dimethyl formamide (139.6 g) by warming to 70°C in a sealed vessel. The solution was cooled to about 20°C and a non-ionic surfactant (6 g), Triton X100 was added with stirring. Fluon L171 (24 g; PTFE lubricant powder of medium particle diameter 3–4 μm, as measured optically) was stirred into the solution. The mixture was stirred for 3 minutes on a Silverson Mixer, Model No. L2R using a screen having aperture diameter of ⅜ inch (1 cm) after which the screen was replaced by a screen having mean aperture diameter of 1/32 inch (0.8 mm) and the mixture was stirred for a further 5 minutes. The speed of stirring was varied such that vigorous mixing was obtained without trapping air bubbles in the mix.

A portion of the mixture (A) wasa spread onto a stainless steel "Hegman" gauge (a known apparatus allowing measurement of film thickness of a coating material), dried at 150°C for 15 minutes and sintered at 350°C for 30 minutes. Inspection of the coating showed that a thickness of 50 μm was obtained without mud-cracking. Coating thickness was assessed by "Permascope" (Helmut Fischer GmbH, Stuttgart, Germany).

Adhesion was assessed by spraying the mixture onto a plaque of aluminium (previously grit-blasted with 60 mesh alumina) which was then dried at 150°C for 15 minutes and sintered in air at 350°C for 15 minutes. A Permascope reading of the coated surface gave a reading of 32 µm. The adhesion was assessed according to the following tests:

1. By cutting through the coating and into the metal with a razor blade to give a cross-hatched pattern of cuts providing approximately 3 × 3 mm squares over an area of 625 mm². The adhesion of the coating is then assessed by firmly pressing a length of 25 mm wide, pressure-sensitive, adhesive tape over the cross-hatched area and subsequently pulling the tape sharply backwards at an angle of 45° to the direction of application. The application are is repeated with fresh tape until there is evidence that the coating is detaching from the metal or, if no failure is observed, up to a maximum of 15 times.

2. The cross-hatching procedure of test 1 was repeated and the test plaque was then immersed in a vegetable based cooking oil at 200°C for 3 hours. The adhesive tape test is carried out, after washing and drying the plaque, up to a maximum of 15 times.

In the case of the present example, no adhesion failure was seen after 15 applications of tape both before and after the hot oil test. A coating is regarded as showing satisfactory adhesion if it withstands more than five applications of tape.

A further series of polysulphone/PTFE mixtures were made using the above materials and procedure except that the quantities were varied as follows.

|   | Polysulphone (g) | Dimethyl formamide (g) | PTFE "Fluon" L171 (g) | 'Triton' X100 (g) |
|---|---|---|---|---|
| B | 18.0 | 137.6 | 18.0 | 20.0 |
| C | 18.0 | 151.6 | 18.0 | 6.0 |
| D | 18.0 | 155.6 | 18.0 | 2.0 |
| E | 30.0 | 127.6 | 30.0 | 6.0 |

Portions of the mixtures were sprayed onto aluminium plaques which had either been grit blasted with 60 mesh alumina or etched with sodium hydroxide (10% w/w aqueous solution). The sprayed plaques were dried at 150°C for 15 minutes and sintered at 350°C in air for 15 minutes. Permascope thickness readings (µm) for each coating are presented in the following table.

|   | Grit blasted plaque | Etched plaque |
|---|---|---|
| B | 22 | 25 |
| C | 26 | 20 |
| D | 22 | 12 |
| E | 46 | 30 |

No adhesion failure was found after 15 applications of tape both before and after the hot oil test in any of the above eight coatings.

EXAMPLE 7

The procedure described in Example 6 (mixture A) was used except that the non-ionic surfactant was Triton X15.

Permascope readings of the coated surfaces of grit-blasted plaque and sodium hydroxide etched plaques were 22 µm and 21 µm respectively. No adhesion failure was noted after 15 applications of tape before and after the hot oil test.

EXAMPLE 8

A sample (36 g) of polysulphone described in Example 6 was milled with water (144 g) containing 1% by weight triton X100 in a stainless steel ball mill for 7 days. A portion of the dispersion (131.8 g) was mixed with PTFE (Fluon L169B; 5.65 g) using a Silverson mixer. The resulting mixture contained 23.3% by weight solids and a PTFE:polysulphone ratio of 1.5:7, i.e. (17.6% by weight PTFE based on total polymer).

Two aluminium plates (one etched using caustic soda solution, the other grit blasted) were sprayed with portions of the above dispersion. The plates were dried in an air oven at 150°C for 15 minutes, then baked in air at 360°C for 15 minutes.

The resulting coatings were brown with good adhesion to the metal. Similar coatings but containing no polysulphone showed poor adhesion.

EXAMPLE 9

A portion (97.77 g) of the PTFE/polysulphone dispersion of Example 8 was mixed with PTFE (14.77 g, Fluon L169B) and water (2.25 cm³) containing 33% by weight Triton X100 using the Silverson mixer. The resulting mixture contained 33% by weight of solids and a PTFE:polysulphone ration of 1:1 (i.e. 50% by weight PTFE based on total polymer).

Two caustic soda etched aluminium plates were sprayed with portions of the dispersion, one plate was dried at 80°–150°C, the other at 150°C. Both plates were then baked in air at 350°C for 15 minutes. The coatings were almost continuous and showed good adhesion to the metal. Similar coatings but containing no polysulphone showed poor adhesion.

EXAMPLE 10

A portion of mixture (A) described in Example 6 was sprayed onto an aluminium plaque which had been degreased and etched in aqueous sodium hydroxide (10% by weight) for 10 minutes. The coating so formed was dried at 150°C for 15 minutes and sintered in air at 350°C for 15 minutes. A Permascope reading of the coated surface showed a coating thickness of 35 µm. No adhesion failure was observed after 15 applications of tape both before and after the hot oil test (Test 2 of Example 6).

EXAMPLE 11

A sample of aromatic polysulphone described in Example 6 was found to have particle size of 550 µm. The powder was subjected to fluid energy milling using a "Jet-o-Mizer" 0202 (Fluid Energy Processing and Processing and Equipment Company, Philadelphia, U.S.A.) and product therefrom found to have particle sizes 54.45 µm and 123 µm at feed rates of 2 kg/hour and 4 kg/hour respectively.

A portion (227.6 g) of the polysulphone having smaller particle size was milled with 946.4 g of an aqueous solution of Triton X100 (1.9T w/w) in a ceramic ball mill (5 dm³) for 178 hours to produce dispersion F (19.3% solids). The particle size of polymer in dispersion F was 14.5 µm whereas that of a similar aqueous dispersion but having 25% solids was 18.0 µm after 202 hours milling. A dispersion similar to dispersion F but produced by edge-roller milling was found to have particle size of 16.0 µm after 104 hours but evaporation losses had to be made up. Dry ball milling produced a powder having particle size of 45 µm. Particle size was determined using a Micromerograph, (Pennwalt Corporation, Pennsylvania, U.S.A.).

To a portion (200 g) of dispersion F were added 6.4 g of an aqueous solution of ammonium perfluorooctanoate (1.4% w/w) followed by PTFE (20.0 g; Fluon L171). The mixture was stirred for 3 minutes on a Silverson Mixer, Model No. L2R using a screen having aperture diameter of ⅜ inch (1 cm) after which the screen was replaced by a screen having mean aperture diameter of 1/32 inch (0.8 mm) and the mixture was stirred for a further 1.5 minutes. The speed of stirring was varied such that vigorous mixing was obtained without trapping air bubbles in the mix.

A portion of the mixture was sprayed onto a plaque of aluminium (previously grit-blasted with 60 mesh alumina) and also onto a plaque of aluminium (previously etched for 10 minutes with 10% w/w aqueous sodium hydroxide). The coating was dried at 150°C for 15 minutes and sintered in air at 360°C for 15 minutes. Permascope readings of the coated surfaces gave 56 μm (for coating on the grit-blasted plaques) and 46 μm (for coating on the etched surface). No adhesion failure was observed after 15 applications of tape both before and after the hot oil test.

Eggs, hamburgers and pancakes could be successfully cooked on the coated surfaces of said plaques without sticking.

EXAMPLE 12

To a portion (200 g) of dispersion F of Example 11 were added non-ionic fluorochemical surfactants (2.7 g) having the formula

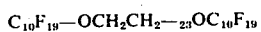

dissolved in water (6.4 g). A marked decrease in the viscosity of the polysulphone dispersion was noted. PTFE (20 g; Fluon L171) was then mixed with this dispersion using the Silverson Mixer as described in Example 6 to produce a final coating mixture.

A portion of the final coating mixture was sprayed onto grit-blasted and etched aluminium plaques, dried at 150°C for 15 minutes and sintered in air at 360°C for 15 minutes. Permascope readings of the coated surfaces were 68 μm (for gritted surface) and 48 μm (for the etched surface). No adhesion failure was noted after 15 applications of tape both before and after the hot oil test when a gritted substrate was used. However the coating failed on the etched substrate after 2 applications of tape before the hot oil test.

EXAMPLE 13

A sample (166.5 g) of the final coating mixture described in Example 12 was mixed with titanium dioxide (7.3 g; "Hombitan" R101D, Sachtleben, Leverkusen, W.Germany) using a Silverson Mixer Model L2R for 5 minutes having a screen aperture of 1/32 inch (0.8 mm).

The coating was sprayed onto grit-blasted and etched aluminium plaques which, after drying at 150°C (15 minutes) and sintering at 360°C (15 minutes), gave Permascope readings of 53 μm (coating a grit-blasted aluminium) and 42 μm (coating on etched aluminium). Adhesion assessment by the methods used in Example 6 showed the coating composition to have good adhesion to each substrate. No adhesion failure was noted after 15 applications of tape both before and after the hot oil test.

EXAMPLE 14

PTFE lubricant powder (Fluon L171, 24 g) was dispersed in a solution comprising Triton X100 (6.0 g) and dimethyl formamide (163.3 g) using a Silverson mixer Model No. L2R. A screen having aperture diameter of ⅜ inch (1 cm) was used for 3 minutes and then a screen having aperture diameter 1/32 inch (0.8 mm) was used for 5 minutes. The PTFE separated from the dimethyl formamide solution unless frequently agitated.

The mixture was sprayed onto aluminium plaques one having been grit-blasted using alumina and the other having been degreased and etched for 10 minutes by aqueous sodium hydroxide (10% by weight). The PEFE tended to separate from the dimethyl formamide as it was sprayed onto the plaques. After drying both plaques at 150°C for 15 minutes and sintering in air at 350°C for 15 minutes, non-continuous coatings had been formed.

Adhesion testing was carried out as described in Example 6. Adhesion failure of the coating was noted after one application of the pressure sensitive tape in the case of the etched aluminium plaque and after two applications of the tape in the case of the grit-blasted aluminium plaque.

Test 2 of Example 6 was not carried out (i.e. immersion of the plaques in oil at 200°C for 3 hours) because of the poor adhesion.

We claim:

1. A solid surface hving a baked on, substantially crosslinked coating formed from an adhesive composition comprising an aromatic polysulphone whose number average molecular weight is sufficiently high to give a reduced viscosity of at least 0.3 (measured at 25°C on a solution in dimethyl formamide containing 1 g of polymer in 100 cm³ of solution) and which contains at least 0.2 aromatically bound hydroxy end-groups per 100 polymer repeat units, said coating being characterized by its increased adhesion to said surface as evidenced by increased shear strength compared with the case where said coating is formed from a similar polysulphone with less than the indicated number of aromatically bound hydroxyl groups, the polysulphone being crosslinked at the molecular weight thereof being increased subsequent to coating by baking the coating in the presence of oxygen, said increased molecular weight and substantial crosslinking being evidenced by the insolubility of the baked polysulphone coating in dimethyl fomamide at 25°C compared with the solubility of the aromatic polysulphone in the non-baked coating and the solubility of the aromatic polysulphone when baked in the absence of air under otherwise comparable conditions.

2. A solid surface according to claim 1 in which the molecular weight of the aromatic polysulphone was increased by heating at temperatures of 350° to 450°C.

3. A solid surface according to claim 1 in which said surface is the non-cooking surface of cookware.

4. A solid surface according to claim 1 in which the aromatic polysulphone contains pigment.

5. A solid surface according to claim 1 in which the aromatic polysulphone is based on repeat units having the formula I or II either alone or in combination with each other and/or with up to 80% of units having the formula III

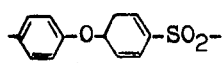 I

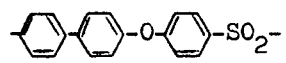 II

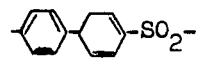 III

6. A solid surface according to claim 1 in which the aromatic polysulphone contains 0.5 to 3.0 aromatically bound hydroxyl groups per 100 polymer repeat units.

7. A solid surface according to claim 1 in which the aromatic polysulphone is blended with at least one fluorocarbon polymer so as to form a coating mixture which comprises 10 to 90% of at least one thermoplastic aromatic polysulphone and 90 to 10% of at least one fluorocarbon polymer.

8. A solid surface according to claim 7 in which the fluorocarbon polymer is poly(tetrafluoroethylene).

9. A solid surface according to claim 7 in which said surface is the cooking surface of cookware.

10. A solid surface according to claim 1 in which the coating was baked at 330° to 450°C.

* * * * *